United States Patent Office 3,472,459
Patented Oct. 14, 1969

3,472,459
PROCESS FOR THE PRODUCTION OF SILICAS SUITABLE FOR MATTING OF LACQUERS AND PLASTIC MATERIALS
Karl Pfeifer, Bad Homburg vor der Hohe, Gunther Bretschneider, Gelnhausen, Rudolf Schwarz, Gross-Auheim, and Karl Laun, Frankfurt am Main, Germany, assignors to Deutsche Gold- und Silber-Scheideanstalt vormals Roessler, Frankfurt am Main, Germany
No Drawing. Filed Mar. 7, 1966, Ser. No. 532,066
Claims priority, application Germany, Mar. 8, 1965, D 46,728
Int. Cl. B02c 19/00, 23/00
U.S. Cl. 241—19               4 Claims

ABSTRACT OF THE DISCLOSURE

Process for the treatment of finely divided synthetic silicas in which the size of the primary particles is essentially below 0.1 $\mu$m. and in which said primary particles are agglomerated to secondary particles with porous structure to produce a product suitable as a matting agent in lacquers wherein such silicas are subjected to a simultaneous combined grinding and air classifying process and in which the portions of the agglomerates which have been reduced to a particle size between 1 and 20 $\mu$m. are continuously removed from the grinding space in suspended state as they are formed and air classified to obtain a product in which the particle size is esentially between 1 $\mu$m. and 20 $\mu$m., preferably, between 2 and 10 $\mu$m., and in which the finest fraction with a particle size below 1 $\mu$m. is less than 25%, preferably, less than 10%, and the coarse material having a particle size above 20 $\mu$m. is returned to the grinding space.

This invention relates to a process for the production of silicas suitable for matting of lacquers and plastic materials which silicas consist of pyrogenic or precipitated silicas or of silicas or mixtures of silicas obtaned by a hydrothermal reaction of natural products, especially quartz sand. These silicas are distinguished by their porous structure and consequently have little tendency to result in sedimentation. For lacquered objects made of wood or plastic material but also for metal products mat or semi-mat surfaces (having a silk-like luster) are more and more preferred instead of smooth high gloss surfaces. The actual top layer which is the source of the surface effect may be transparent or pigmented. In the former case we have what is called "clear lacquers" which even when mat clearly show the structure of the underlying material, e.g., the grain of wood. Pigmented lacquers, on the other hand, conceal the surface of the base material. Both systems may be formed "glossy" or "mat," which means that the matting or dulling must be considered a surface phenomenon of the lacquer which may be obtained by special additives for the different lacquers. With these additives a graduated, differential, non-uniform formation of the otherwise smooth surface may be accomplished depending on the matting agents employed. Thus, instead of a specifically oriented reflection of the light (glossy surface through mirror effects), a more or less diffuse scattering occurs which to the eye appears as a dulling or matting effect.

It is known to use powdered, finely divided substances for the matting with such silicas or silicates being preferred whose refraction index approaches that of the lacquer system. Beside the refraction index, it is the size of the effective particles or agglomerates which is of special significance.

To produce suitable matting agents the silicas made by conventional processes may be used, such as silicas obtained e.g., by precipitation of sodium silicate with acids under various conditions, further silicas made from sodium silicate by treatment with ion-exchangers as well as silicas made by hydrothermal methods and via volatile silicon compounds, e.g., $SiCl_4$, by flame hydrolysis in the gas phase. Also arc processes have been used with success for obtaining silicas suitable for matting agents. More or less all of these products can be used as matting agent after the necessary treatment and provided that they have the desired optimal particle size which lies between 1 and 20 $\mu$m. (1 $\mu$m.=$10^{-3}$ mm.), preferably between 2 and 10 $\mu$m.

A porous structure of the effective particles is also of advantage. The cavitation effects a loose arrangement of the matting agent in the lacquer coating and, on account of the low apparent density of the agents, permits obtaining sufficient matting effects with less than half the quantity of the material which would be required for more compact particles. The advantage of the porous structure lies furthermore in the lower tendency to result in sedimentation.

When using the mentioned silica obtained in a wet process by precipitation or hydrothermal reaction the portion of particles or agglomerates with diameters of >20 $\mu$m. is always too high thus resulting in undesirable, distinctly noticeable rough surfaces.

In pyrogenic or arc silica, however, the fraction under 1 $\mu$m. is too high. Since this portion does not contribute to the matting effect too much thickening of the mat lacquers and therefore poor machinability occurs. Added to this is the fact of an inherently relatively low grind stability of the secondary agglomerates of these silicas which otherwise lie within the correct size range. These agglomerates can be split up through vigorous working, e.g., on a rolling mill but they will then mostly be in the undesirable fine and superfine range. With the thus necessary increased amount of matting agent, the undesirable thickening effect will be even more noticeable. By secondary processes one can increase the grinding stability of the agglomerates of these silicas but generally the particle size will then range above 20 $\mu$m. which has the undesirable results mentioned above in connection with the precipitated silicas.

Attempts to obtain the desired result merely by conventional grinding processes were without success or turned out to be too complicated and uneconomical since with the conventional methods the spectrum of particle size comes out much too broad for the intended purpose. Once most of the grinding material has been reduced to the desired particle size below 20 $\mu$m. a considerable part turn out to be comminuted to a diameter below 1 to 2 $\mu$m. and therefore no longer does have a matting effect but still thickens the lacquer system in an unacceptable way.

The invention therefore has the object to provide a process for the production of silicas suitable for matting of lacquers and plastic materials, the silicas consisting of pyrogenically obtainable or precipitated silicas or of silicas and mixtures thereof obtained by a hydrothermal reaction of natural products, especially quartz sand, in order to obtain products which are characterized by a porous structure and good sedimentation properties and which show an optimal size of the particles or agglomerates in the range between 1 and 20 $\mu$m., preferably between 2 and 10 $\mu$m.

The characterizing feature of the invention resides in the fact that silicas obtained by conventional processes the primary particles of which are smaller than 0.1 $\mu$m. and which are combined to form distinct secondary agglomerates with a porous structure, are simultaneously ground and air classified (separated) so that the size of the resulting secondary particles lies between 1 and 20 $\mu$m., preferably between 2 and 10 $\mu$m. and the superfine portion below 1 $\mu$m. amounts to 25% or less, preferably 10% or less.

The essential problem for the development of matting agents may be seen in this: The quantitatively predominant part of the silica which possesses the above mentioned properties must be brought to the for matting purposes effective particle size of the agglomerates within the range between 1 and 20 μm. and this must be done in an economically acceptable manner. This could not be accomplished up to now with conventional grinding processes.

The essential point for the desired matting effect is a low fraction of the superfine particles. It is extremely difficult, if not impossible, in case of a product containing a high fraction of superfine particles, subsequently to remove this fraction since the separation by classifiers in the range below 1 to 2 μm. is, if at all practical, only possible by highly complex and time-consuming methods. One of the principal advantages of the process of the invention is that the grinding is carried out in a manner that such fraction of superfine particles does not occur in undesired amounts when starting from silicas with a distinct secondary structure (agglomerates). According to the invention the grinding step is combined with the classifying process without involving a separate classifying step after completion of the grinding. The size of the secondary particles thus obtained lies between 1 and 20 μm., preferably between 2 and 10 μm. and the fraction of superfine particles below 1 μm. amounts to not more than 25%, preferably to not more than 10%.

This combined grinding and classifying process should be carried out in a manner that grinding and classifying take place simultaneously and continuously and the particles of the agglomerates, as soon as they have reached the desired size of 20–1μm., are removed from the grinding chamber and classified whilst the coarse fraction above 20 μm. is reintroduced from the classifier into the grinding chamber until the grinding has resulted in the desired size. The particle size of the products substantially is in the range between 1 to 20 μm. with a maximum between 2 and 10 μm. The fraction of the superfine particles below 1 μm. amounts to 25% or less whereas the coarse fraction above 20 μm. practically is nil.

The products obtained according to the invention as evidenced by the following examples are especially suited for matting of lacquers of different systems (polyester-, nitro-, alkyd-, "Desmodur"/"Desmophen," etc.) both in clear lacquers and in pigmented systems. The matting effect of the silicas according to the invention was tested in the following lacquer systems:

(1) Black lacquer for firing (L)

|  | G. |
|---|---|
| Alkydal R 64 (75% in xylene) | 54.5 |
| Maprenal NP (55% in butanol) | 12.0 |
| Ethylglygol | 2.5 |
| Butanol | 2.5 |
| Toluene | 8.0 |
| Xylene | 13.5 |
| Lacquer premixture | 5.0 |
| Silicone oil (10% in toluene) | 2.0 |
|  | 100.0 |
| Matting agents | 5.0 |

(2) Acid catalyzed lacquer (SHL)

|  | G. |
|---|---|
| Alkydal R 40 (60% in xylene) | 38.0 |
| Maprenal NP (55% in butanol) | 42.0 |
| Butanol | 7.0 |
| Ethanol | 9.0 |
| Silicone oil (1% in toluene) | 4.0 |
|  | 100.0 |
| Matting agents | 9.6 |
| Hydrochloric acid | 10.0 |

(3) Polyester-lacquer (UPL)

|  | G. |
|---|---|
| Roskydal 500 B | 52.0 |
| Roskydal 550 | 13.0 |
| Silicone oil OL (10% in toluene) | 3.2 |
| Monostyrene | 28.6 |
| Co-naphthenate (10% in toluene) | 3.2 |
|  | 100.0 |
| Matting agents | 6.5 |
| Cyclonox-Paste AP (20% in ethylacetate) | 10.0 |

(4) DD-lacquer (DDL)

|  | G. |
|---|---|
| Desmophen 800 | 15.0 |
| Desmophen 1100 | 20.0 |
| Cellit BP 700 | 0.3 |
| Silicone oil OL (10% in toluene) | 0.1 |
| Mowilith 20 (50% in ethylacetate) | 3.0 |
| Butylacetate 98% | 10.0 |
| Methylglycolacetate | 7.0 |
| Ethylglycolacetate | 10.0 |
| Shellsol A | 29.6 |
| Butoxyl | 5.0 |
|  | 100.0 |
| Matting agents | 10.8 |
| Desmodur L (75% in ethylacetate) | 50.0 |

(5) Nitro-Combination Lacquer (NL) silk-like luster

|  | G. |
|---|---|
| Collodion cotton E 400 butanol wetted | 18.0 |
| "Jaegalyd" E 42 (60% in xylene) | 16.0 |
| Dibutylphthalate | 1.8 |
| Silicone oil OL (1% in toluene) | 0.2 |
| Butanol | 6.0 |
| Butylacetate | 18.0 |
| Ethylacetate | 22.0 |
| Toluene | 18.0 |
|  | 100.0 |
| Matting agents | 0.8 |

The silicas to be tested were intermixed for 10 minutes with the finished lacquer system by means of a high speed stirrer (with mixing propeller). The lacquers were then diluted, screened through a sieve of 10,000 mesh/cm.$^2$ and then sprayed with a spray gun onto glass plates (for SHL, UPL, DDL, NL) or thin foils (for EL). The samples of the air drying lacquers were tested after 24 hours.

EXAMPLE 1

Two different wet precipitated not pretreated commercial silicas (A and B) having a primary particle size of about 20 nm. (1 nm.=10$^{-6}$ mm.) and secondary particles of less than 1 to 100 μm, with the superfine particle fraction below 1 μm. amounting to about 3%, were used in the usual manner as matting agents in clear lacquers as well as in pigmented lacquers (systems 1 to 5). It was found that, although in all cases a rough matting effect was obtained, a measurement and evaluation (according to Table 1) did not produce comparable values because of the coarseness and unevenness of the surface. These untreated commercial silicas due to the formation of a coarse, almost sandy, surface are unsuited for usual lacquering purposes.

EXAMPLE 2

A commercial silica precipitated and separated in conventional manner from sodium water glass with sulphuric acid was separately ground and classified after drying by first passing the silica to a pinwheel mill and then classifying the ground material in a separate process step with a spiral air classifier.

A silica was obtained with agglomerates below 1 to 15 μm. The superfine particle fraction below 1 μm. amounted to about 12%. Table 1 shows that only a limited matting effect was achieved. Besides, the yield of air classified material suitable for matting was only 44%; this process is therefore uneconomical.

EXAMPLE 3

A silica precipitated, separated and dried according to Example 2 was treated according to the invention in a combined grinding- and air classifying apparatus in one process step. The silica was introduced into the grinding chamber with a throughput of 25 kg./h. and the fine fraction continuously obtained in the air classifying step was drawn off into a hopper with a vacuum of about 430 mm. Torr. The grinding- and air classifying apparatus operates in the following manner: The particles drawn off from the grinding chamber by an adjustable air current are classified in the air classifying system and separated in such a way that the particles having a size of more than 10–15 μm. are fed back into the grinding space, whereas the particles having a size of less than 10–15 μm. are pneumatically drawn off from the system into a hopper. A silica was obtained with secondary particles of less than 1–15 μm., the superfine particle fraction of less than 1 μm. amounted to only about 5%. Table I shows that the matting effect increased considerably compared with the silica according to Example 2. The yield from this process was practically 100%.

EXAMPLE 4

A hydrothermal silica having primary particles in the form of spheroidal particles of a diameter of about 10 nm. and ledge shaped crystals of a length of 100 to 250 nm. was produced by a ninety-minute heating of a mixture of calcium hydrate and quartz sand (in a weight proportion of $CaO:SiO_2=1.25:1.0$) in an aqueous suspension at a pressure up to about 200° C., followed by extraction of the thus formed calcium silicate suspension with diluted HCl at 70° C. until an acid reaction (pH 2–3), was obtained, then separating, drying and grinding on a pinwheel mill.

A silica ($SiO_2$ content of >98%) was obtained with secondary particles of <1–40 μm. The superfine particle fraction <1 μm. was about 15%.

The use of this silica as matting agent in the aforementioned lacquer systems yielded rough surfaces with numerous big patches.

After classifying in a spiral air classifier a silica was obtained with secondary particles of <1–10 μm., the superfine particle fraction <1 μm. was about 30%. The yield of the air classifier was 75%.

The matting properties were satisfactory (see Table 1). The different finished lacquers however had a tendency to thicken because of the high fraction of superfine particles in the matting agent which affected the workability of the lacquers.

EXAMPLE 5

A silica manufactured and separated according to Example 4 but not ground was treated according to the invention in a combined grinding and air classifying apparatus as described in Example 3.

A silica with secondary particles of <1–15 μm. was obtained. The superfine particle fraction <1 μm. was 10%. The yield was practically 100%. The matting properties were better than those of the silica according to Example 4, see Table 1; the tendency for thickening of the lacquer was far lower.

EXAMPLE 6

A silica obtained pyrogenically in conventional manner from quartz sand in an arc process having a primary particle size of 20–60 μm. and a $SiO_2$ content of >99% consisted of secondary particles of <1–30 μm., the superfine particle fraction <1 μm. being 10%.

The use of this silica as matting agent yielded a rough surface, the material was therefore classified in a spiral air classifier. The fine particle fraction obtained had a secondary particle range of <1–15 μm. and contained a superfine particle fraction <1 μm. of 25%.

The matting properties were satisfactory (see Table 1). The yield of the air classifier, however, was only about 40%.

EXAMPLE 7

A pyrogenic silica manufactured and separated according to Example 6 but not ground and not air classified was treated according to the invention in a combined grinding and air classifying apparatus as described in Example 3. A silica was obtained with secondary particles of a size <1–15 μm. The superfine particle fraction <1 μm. was 10%. The yield was practically 100%. The matting properties were better than the matting properties achieved according to Example 6, see Table 1.

TABLE 1.—DEGREES OF GLOSS OF THE DIFFERENT SILICAS

| Ex. | Type of silica manufacture | Percent | | | | |
|---|---|---|---|---|---|---|
| | | EL | SHL | UPL | DDL | NL |
| 2 | Precipitated | 13 | 10 | 43 | 45 | |
| 3 | do | 5.5 | 5.5 | 30 | 36 | 41 |
| 4 | Hydrothermal | 7.0 | 7.0 | 33 | 39 | |
| 5 | do | 5.0 | 5.0 | 24 | 35 | 39 |
| 6 | Pyrogenic | 7.0 | 7.0 | 21 | 38 | |
| 7 | do | 4.5 | 6.5 | 17 | 23 | 44 |

The degree of gloss was measured with a gloss meter by length, type 259, under an angle of 45°.

The test of the flat lacquer samples manufactured according to above formulations EL, SHL, UPL and DDL was carried out as follows. The degree of gloss was taken as the measure for the matting effect. The degree of gloss indicates (in percent) the part of a beam light falling on the lacquer surface at a given angle which is reflected at the same angle. With glossy surfaces degrees of gloss were measured which were slightly below 100%. The stronger the matting the lower was the gloss degree. Good matting agents at the same conditions show lower degrees of gloss than inferior matting agents.

Table 1 shows the degree of gloss of the silicas described in Examples 2 to 7. Example 1 was intentionally omitted because coarse silicas due to their rough surface may have a good matting effect i.e., very low degrees of gloss, but are unsuitable for lacquers because of their coarseness.

We claim:

1. A process for the treatment of finely divided synthetic silica in which the size of the primary particles is essentially below 0.1 μm. and in which such primary particles are agglomerated to secondary particles with porous structure to produce a product adapted as a matting agent in lacquers which comprises subjecting said silica to a simultaneous combined grinding and air classifying process in which the portions of the agglomerates which have been reduced to a particle size between 1 and 20 μm. are continuously removed from the grinding space in suspended state as they are formed and air classified to produce a product in which the particle size is essentially between 1 and 20 μm. and in which the finest fraction with a particle size of less than 1 μm. is less than 25%.

2. The process of claim 1 in which said synthetic silica is pyrogenic silica having a primary particle size to 5 to 100 nm. and a secondary particle size of 0.05 to 50 μm. and a specific surface area of 5 to 400 m.²/g.

3. The process of claim 1 in which said synthetic silica is a wet precipitated silica having a primary particle size of 5 to 100 nm. and a secondary particle size of 0.05 to 50 μm. and a specific surface area of 30 to 400 m.²/g.

4. The process of claim 1 in which said synthetic silica is a hydrothermally produced product from quartz sand having a primary particle size of 5 to 200 nm. and a secondary particle size of 0.05 to 50 μm. and a specific surface area of 5 to 400 m.²/g.

References Cited
UNITED STATES PATENTS

| | | | |
|---|---|---|---|
| 2,337,162 | 12/1943 | McCleary | 241—19 |
| 2,941,731 | 6/1960 | Lykken et al. | 241—18 X |
| 3,224,686 | 12/1965 | Wallace | 241—19 |

FRANK T. YOST, Primary Examiner

U.S. Cl. X.R.

241—29